United States Patent
Harada et al.

(10) Patent No.: US 9,242,611 B2
(45) Date of Patent: Jan. 26, 2016

(54) VEHICLE POWER SUPPLY SYSTEM, ENGINE CONTROL UNIT, AND POWER SUPPLY METHOD

(75) Inventors: Tomomi Harada, Hanno (JP); Tatsuya Arai, Hidaka (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 405 days.

(21) Appl. No.: 13/823,738

(22) PCT Filed: Jan. 11, 2012

(86) PCT No.: PCT/JP2012/050406
§ 371 (c)(1),
(2), (4) Date: Mar. 15, 2013

(87) PCT Pub. No.: WO2013/105238
PCT Pub. Date: Jul. 18, 2013

(65) Prior Publication Data
US 2013/0181515 A1    Jul. 18, 2013

(51) Int. Cl.
*B60R 16/03* (2006.01)
(52) U.S. Cl.
CPC ..................................... *B60R 16/03* (2013.01)
(58) Field of Classification Search
CPC .......... B60R 16/03; F02N 11/08; F02N 11/00
See application file for complete search history.

(56) References Cited

U.S. PATENT DOCUMENTS

| | | | |
|---|---|---|---|
| 1,375,736 A * | 4/1921 | Schwarz | 290/35 |
| 5,001,623 A * | 3/1991 | Magid | 363/143 |
| 5,296,997 A * | 3/1994 | Betton et al. | 361/92 |
| 5,949,658 A * | 9/1999 | Thottuvelil et al. | 363/15 |
| 6,320,351 B1 * | 11/2001 | Ng et al. | 320/104 |
| 7,528,579 B2 * | 5/2009 | Pacholok et al. | 320/145 |
| 8,330,288 B2 * | 12/2012 | Larsson | 290/54 |

(Continued)

FOREIGN PATENT DOCUMENTS

| | | | | |
|---|---|---|---|---|
| EP | 0158636 B1 * | 6/1983 | | H02J 7/16 |
| JP | 2002-098032 | 4/2002 | | |

(Continued)

OTHER PUBLICATIONS

IPRP for related PCT/JP2012/050406 dated issued on Jul. 15, 2014 and its English translation.

(Continued)

*Primary Examiner* — Thienvu Tran
*Assistant Examiner* — Pinping Sun
(74) *Attorney, Agent, or Firm* — Ladas & Parry, LLP

(57) ABSTRACT

A engine control unit comprises: a three-phase bridge circuit that has a first end connected to the first end of the first load and a second end connected to a ground, the three-phase bridge circuit performing commutation control on an alternating-current power supplied from the motor generator or driving the motor generator; a DC-DC converter connected between the first end of the three-phase bridge circuit and a second end of the control switch; a diode that has an anode connected to the battery connecting terminal and a cathode connected to the second end of the control switch; a voltage detecting circuit that detects a voltage of the battery connecting terminal; a first switch element connected between a second end of the coil and the ground; a second switch element connected between a second end of the first load and the ground; and a control circuit.

15 Claims, 7 Drawing Sheets

(56) References Cited

U.S. PATENT DOCUMENTS

| | | | |
|---|---|---|---|
| 2006/0012336 A1* | 1/2006 | Fujita | 320/119 |
| 2008/0029153 A1* | 2/2008 | Margalit | 136/252 |
| 2011/0163721 A1* | 7/2011 | Van Wiemeersch | 320/128 |

FOREIGN PATENT DOCUMENTS

| | | | | |
|---|---|---|---|---|
| JP | 2002098032 A | * | 4/2002 | F02N 11/08 |
| JP | 2005-233109 | | 9/2005 | |
| JP | 2007-255294 | | 10/2007 | |
| JP | 2010-223136 | | 10/2010 | |

OTHER PUBLICATIONS

ISR for related PCT/JP2012/050406 mailed on Apr. 3, 2012 (English translation of ISR will be disclosed at a later date).

ISR for related PCT/JP2012/050406 mailed on Apr. 3, 2012 and its English translation.

* cited by examiner

US 9,242,611 B2

VEHICLE POWER SUPPLY SYSTEM, ENGINE CONTROL UNIT, AND POWER SUPPLY METHOD

CROSS-REFERENCE TO RELATED APPLICATIONS

This application is the U.S. national stage of international patent application no. PCT/JP2012/050406 filed on Jan. 11, 2012, the disclosure of which is hereby incorporated by reference in its entirety.

TECHNICAL FIELD OF THE INVENTION

The present invention relates to a vehicle power supply system, an engine control unit, and a power supply method.

BACKGROUND ART

A vehicle power supply system for, for example, self-starting (starting by starting motor) and kick-starting of motorcycles have been proposed (for example, see JP2002-98032A).

The above conventional vehicle power supply system 1000A includes, for example, an engine control unit 100A and two diodes diode1 and diode2 (see FIG. 7) and requires two external relay circuits relay1 and relay2, resulting in a complicated system configuration.

In the conventional vehicle power supply system 1000A, at self-starting, energization to a motor before switching of the contact of the relay circuit relay2 may unfortunately energize a motor generator through the relay circuit relay1 and blow a fuse fuse1. In order to avoid this problem, a user needs to wait for turning-on of the relay circuit relay2 from the time a user presses a starter switch SWS to the time when the energization of a motor M is started, leading to degraded startup performance.

Moreover, in the conventional vehicle power supply system 1000A, at kick-starting, a forward voltage drop of the diode diode1 may reduce a voltage supplied from a power generator (motor generator M) to the engine control unit 100A, unfortunately leading to degraded startup performance at the kick-starting.

Furthermore, the conventional vehicle power supply system 1000A supplies power to an electrical load Load2 (a head lamp H/L, a tail lamp T/L, a stop lamp S/L, a winker lamp W/L) by means of switch elements SWX and SWY to facilitate kick-starting. The electrical load Load 2 is a lamp load having a large inrush current and thus unfortunately, the switch elements SWX and SWY are expensive.

DISCLOSURE OF THE INVENTION

A vehicle power supply system according to one aspect of the invention, comprising:
a control switch that is turned on/off by a user;
a starter switch that is turned on/off by the user;
a relay circuit that is turned on by energizing a coil having a first end connected to a first end of the control switch, thereby making an electrical connection between a battery connecting terminal connected to a battery and a first end of the starter switch and a first end of a first load, and is turned off by deenergizing the coil so as to interrupt the battery connecting terminal from the first end of the starter switch and the first end of the first load; and
an engine control unit that controls power supplied from the battery and a motor generator, wherein the engine control unit comprises:
a three-phase bridge circuit that has a first end connected to the first end of the first load and a second end connected to a ground, the three-phase bridge circuit performing commutation control on an alternating-current power supplied from the motor generator or driving the motor generator;
a DC-DC converter connected between the first end of the three-phase bridge circuit and a second end of the control switch;
a diode that has an anode connected to the battery connecting terminal and a cathode connected to the second end of the control switch;
a voltage detecting circuit that detects a voltage of the battery connecting terminal;
a first switch element connected between a second end of the coil and the ground;
a second switch element connected between a second end of the first load and the ground; and
a control circuit that is supplied with a direct-current power supplied to the first end of the control switch and controls the three-phase bridge circuit and the first and second switch elements.

In the vehicle power supply system, in the case where the control switch is turned on and power is supplied from the first end of the control switch,
the control circuit decides, when the voltage detected by the voltage detecting circuit is equal to or higher than a first set voltage, that a starting condition is a first starting condition in which the battery is connected to the battery connecting terminal and has a voltage equal to or higher than a specified value, and
the control circuit decides, when the detected voltage is lower than the first set voltage, that the starting condition is a second starting condition in which the battery is not connected to the battery connecting terminal or the battery has a voltage lower than the specified value and power is supplied from the motor generator.

In the vehicle power supply system, when the control circuit decides that a starting condition is the first starting condition, the control circuit turns on the first switch element, so that the coil is energized to turn on the relay circuit.

In the vehicle power supply system, in the case where the control circuit is capable of detecting a number of revolutions of the motor generator and decides that the starting condition is the second starting condition,
the control circuit decides, when the number of revolutions of the motor generator is equal to or higher than a set number of revolutions, that an engine connected to the motor generator has been started, and turns on the first switch element, thereby energizing the coil to turn on the relay circuit, and
the control circuit decides, when the number of revolutions of the motor generator is lower than the set number of revolutions, that the engine is being started, and turns off the first switch element, thereby deenergizing the coil to turn off the relay circuit.

In the vehicle power supply system, the voltage detecting circuit includes:
a PNP bipolar transistor having an emitter connected to the battery connecting terminal and a collector connected to the control circuit, and
an NPN bipolar transistor having a collector connected to the base of the PNP bipolar transistor, an emitter connected to the ground, and a base connected to one end of the control switch.

In the vehicle power supply system, in the case where a number of revolutions of the motor generator is detectable, and the number of revolutions of the motor generator is lower than a set number of revolutions, the control circuit decides whether to drive the motor generator depending on a state of degradation of the battery.

In the vehicle power supply system, in the case where the number of revolutions of the motor generator is lower than the set number of revolutions, the control circuit decides, when the starter switch is turned on and the relay circuit is turned on, whether a set time has elapsed from a time the starter switch is turned on, and in the case where the set time has elapsed, the control circuit drives the motor generator when the voltage detected by the voltage detecting circuit is equal to or higher than a second set voltage.

In the vehicle power supply system, the control circuit decides whether a set time has elapsed from a time the starter switch is turned on, and then the control circuit drives the motor generator without detecting the voltage of the battery connecting terminal by means of the voltage detecting circuit in the case where the set time has not elapsed.

In the vehicle power supply system, the control circuit decides whether a set time has elapsed from a time the starter switch is turned on, and then the control circuit turns off the first switch element to turn off the relay circuit and stop driving the motor generator in the case where the set time has elapsed and the detected voltage is lower than the second set voltage.

In the vehicle power supply system, in the case where a number of revolutions of the motor generator is lower than a set number of revolutions and the starter switch is turned off or the relay circuit is turned off, the control circuit stops driving the motor generator.

In the vehicle power supply system, the engine control unit further comprises a current detecting circuit that detects a current passing through the three-phase bridge circuit, and wherein, in the case where a current detected by the current detecting circuit has a current value corresponding to an overcurrent, the control circuit turns off the relay circuit by turning off the first switch element.

In the vehicle power supply system, in the case where the engine is started, the control circuit supplies a power outputted from the motor generator to the battery through the three-phase bridge circuit and the relay circuit.

In the vehicle power supply system, the engine control unit further comprises a regulator that adjusts a voltage at one end of the control switch to a predetermined value and then supplies the voltage to the control circuit.

In the vehicle power supply system, the first load is a fuel pump of an engine, an injector of the engine, or an ignition coil of the engine.

An engine control unit according to one aspect of the invention applied to a vehicle power supply system, the engine control unit comprising: a control switch that is turned on/off by a user; a starter switch that is turned on/off by the user; a relay circuit that is turned on by energizing a coil having a first end connected to a first end of the control switch, thereby making an electrical connection between a battery connecting terminal connected to a battery and a first end of the starter switch and a first end of a first load, and is turned off by deenergizing the coil so as to interrupt the battery connecting terminal from the first end of the starter switch and the first end of the first load; and an engine control unit that controls power supplied from the battery and a motor generator, wherein the engine control unit comprises:

a three-phase bridge circuit that has a first end connected to the first end of the first load and a second end connected to a ground, the three-phase bridge circuit performing commutation control on an alternating-current power supplied from the motor generator or driving the motor generator;

a DC-DC converter connected between the first end of the three-phase bridge circuit and a second end of the control switch;

a diode that has an anode connected to the battery connecting terminal and a cathode connected to the second end of the control switch;

a voltage detecting circuit that detects a voltage of the battery connecting terminal;

a first switch element connected between a second end of the coil and the ground;

a second switch element connected between a second end of the first load and the ground; and a control circuit that is supplied with a direct-current power supplied to the first end of the control switch and controls the three-phase bridge circuit and the first and second switch elements.

A power supply method according to one aspect of the invention applied to a vehicle power supply system, comprising: a control switch that is turned on/off by a user; a starter switch that is turned on/off by the user; a relay circuit that is turned on by energizing a coil having a first end connected to a first end of the control switch, thereby making an electrical connection between a battery connecting terminal connected to a battery and a first end of the starter switch and a first end of a first load, and is turned off by deenergizing the coil so as to interrupt the battery connecting terminal from the first end of the starter switch and the first end of the first load; and an engine control unit that controls power supplied from the battery and a motor generator, wherein the engine control unit comprises: a three-phase bridge circuit that has a first end connected to the first end of the first load and a second end connected to a ground, the three-phase bridge circuit performing commutation control on an alternating-current power supplied from the motor generator or driving the motor generator; a DC-DC converter connected between the first end of the three-phase bridge circuit and a second end of the control switch; a diode that has an anode connected to the battery connecting terminal and a cathode connected to the second end of the control switch; a voltage detecting circuit that detects a voltage of the battery connecting terminal; a first switch element connected between a second end of the coil and the ground; a second switch element connected between a second end of the first load and the ground; and a control circuit that is supplied with a direct-current power supplied to the first end of the control switch and controls the three-phase bridge circuit and the first and second switch elements, the power supply method comprising: in the case where the control switch is turned on and power is supplied from the first end of the control switch, deciding, when the voltage detected by the voltage detecting circuit is equal to or higher than a first set voltage, that a starting condition is a first starting condition in which the battery is connected to the battery connecting terminal and has a voltage equal to or higher than a specified value, and deciding, when the detected voltage is lower than the first set voltage, that the starting condition is a second starting condition in which the battery is not connected to the battery connecting terminal or the battery has a voltage lower than the specified value and power is supplied from the motor generator.

A vehicle power supply system according to an embodiment of the present invention achieves self-starting and kick-starting with a single diode and a single relay circuit.

Therefore, the cost of a system and an engine control unit can be reduced and a harness can be remarkably shortened according to a simplification of the system, achieving lower system cost.

Furthermore, a motor current is applied only through a relay circuit from a motor generator.

Thus, the relay circuit is turned on at the startup of a control circuit. This allows a user's press to turn on a starter switch so as to quickly energize the motor, improving startup performance.

The engine control unit is supplied with power through a DC-DC converter in the engine control unit.

Thus, a voltage increase by the DC-DC converter upon kick-starting can shorten the starting time of the control circuit with higher startup performance.

BEST MODE FOR CARRYING OUT THE INVENTION

An embodiment of the present invention will be described below with reference to the accompanying drawings.

First Embodiment

Figure 1:
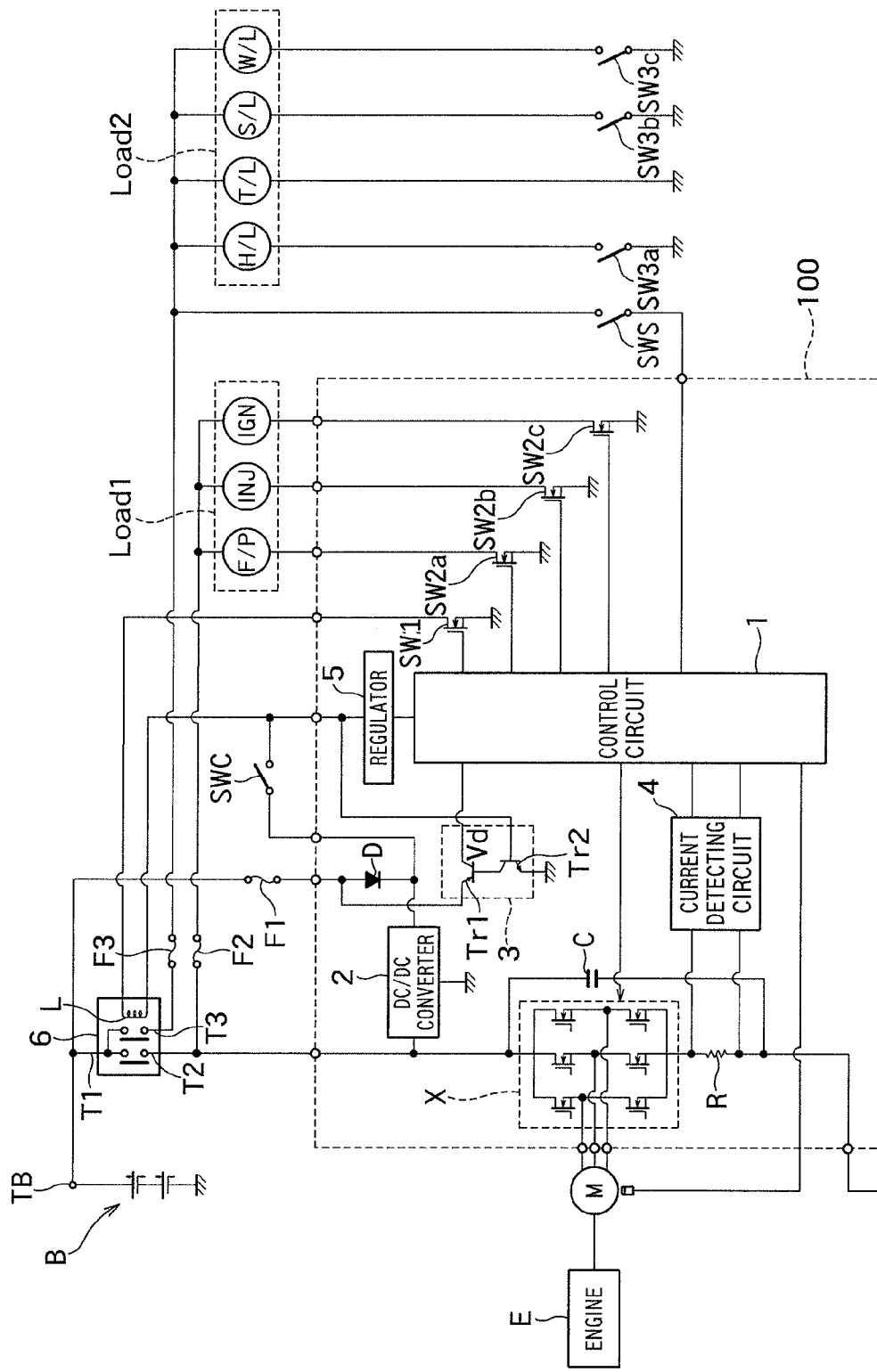
FIG. 1 is a diagram showing an example of a configuration of a vehicle power supply system 1000 according to a first embodiment, which is an aspect of the present invention.

FIG. 1 shows an example of a configuration of a vehicle power supply system 1000 according to a first embodiment, which is an aspect of the present invention.

As shown in FIG. 1, the vehicle power supply system 1000 includes a battery connecting terminal TB, a control switch SWC, a starter switch SWS, switches SW3a, SW3b, and SW3c, fuses F1, F2, and F3, an engine control unit 100, a relay circuit 6, and a motor generator M.

The vehicle power supply system 1000 is installed in a vehicle (motorcycle), which is not shown, with a battery B, an engine E, and the motor generator M.

The motor generator M acts as a starter motor that is a power source for starting the engine E, and acts as a generator that generates electric power from the power of the engine E after the startup of the engine E.

The engine E includes a first load Load1. As shown in FIG. 1, the first load Load1 is, for example, a fuel pump F/P of the engine E, an injector INJ of the engine E, or an ignition coil IGN of the engine E.

The vehicle further includes a second load Load2. As shown in FIG. 1, for example, the second load Load2 includes a head lamp H/L, a tail lamp T/L, a stop lamp S/L, and a winker lamp W/L.

The switch SW3a is connected between the head lamp H/L and a ground. The switch SW3a is turned on/off by a user of the vehicle. The switch element SW3a is turned on/off to control power supply to the head lamp H/L.

The switch SW3b is connected between the stop lamp S/L and the ground. The switch SW3b is turned on/off by the user. The switch SW3b is turned on/off to control power supply to the stop lamp S/L.

The switch SW3c is connected between the winker lamp W/L and the ground. The switch SW3c is turned on/off by the user. The switch SW3c is turned on/off to control power supply to the winker lamp W/L.

The control switch SWC is turned on/off by the user.

The starter switch SWS is turned on/off by the user.

The relay circuit 6 includes a terminal T1 connected to the battery connecting terminal TB, a terminal T2 connected to one end of the load Load1 (one end of a three-phase bridge circuit X), and a third terminal T3 connected to one end of the starter switch SWS (one end of the second load Load2).

In other words, the relay circuit 6 is provided between the battery connecting terminal TB connected to the battery B and one end of the first load Load1 (one end of the three-phase bridge circuit X) and between the battery connecting terminal B and one end of the starter switch SWS (one end of the second load Load2).

The relay circuit 6 is turned on by energizing a coil L having one end connected to one end of the control switch SWC, thereby electrically connecting the terminal T1 and the terminals T2 and T3.

In other words, the relay circuit 6 is turned on by passing a current through the coil L having one end connected to one end of the control switch SWC, thereby passing the current through the battery connecting terminal TB, one end of the starter switch SWS, and one end of the first load Load1 (one end of the three-phase bridge circuit X).

The relay circuit 6 is turned off by deenergizing the coil L, thereby interrupting the terminal T1, the terminal T2, and the terminal T3.

In other words, the relay circuit 6 is turned off by deenergizing the coil L, thereby interrupting the battery connecting terminal TB, one end of the starter switch SWS (one end of the second load Load2), and one end of the first load Load1 (one end of the three-phase bridge circuit X).

The engine control unit 100 controls power supplied from the battery B and the motor generator M.

As shown in FIG. 1, the engine control unit 100 includes, for example, a control circuit 1, a DC-DC converter 2, a voltage detecting circuit 3, a current detecting circuit 4, a regulator 5, a diode D, the three-phase bridge circuit X, a first switch element SW1, and second switch elements SW2a, SW2b, and SW2c.

One end of the three-phase bridge circuit X is connected to one end of the first load Load1, and the other end of the three-phase bridge circuit X is connected to the ground. The three-phase bridge circuit X performs commutation control on an alternating-current power supplied from the motor generator M or drives the motor generator M.

The DC-DC converter 2 is connected between one end of the three-phase bridge circuit X and the other end of the control switch SWC.

The diode D has an anode connected to the battery connecting terminal TB and a cathode connected to the other end of the control switch SWC.

The regulator 5 adjusts a voltage at one end of the control switch SWC to a predetermined value and then supplies the voltage to the control circuit 1.

The first switch element SW1 is connected between the other end of the coil L and the ground.

The second switch elements SW2a, SW2b, and SW2c are connected between the other end of the first load Load1 and the ground.

In other words, the second switch element SW2a is connected between the fuel pump F/P of the engine E and the ground. The second switch element SW2a is turned on/off to control power supply to the fuel pump F/P of the engine E.

The second switch element SW2b is connected between the injector INJ of the engine E and the ground. The second switch element SW2b is turned on/off to control power supply to the injector INJ of the engine E.

The second switch element SW2c is connected between the ignition coil IGN of the engine E and the ground. The second switch element SW2c is turned on/off to control power supply to the ignition coil IGN of the engine E.

As shown in FIG. 1, the first switch element SW1 and the second switch elements SW2a, SW2b, and SW2c are MOS transistors whose gates are connected to the control circuit 1. In other words, as will be described later, the first switch element SW1 and the second switch elements SW2a, SW2b, and SW2c are turned on/off according to a gate voltage outputted from the control circuit.

The voltage detecting circuit 3 is connected to the battery connecting terminal TB via the fuse F1. The voltage detecting circuit 3 detects the voltage of the battery connecting terminal TB and outputs the detected voltage Vd to the control circuit 1.

As shown in FIG. 1, the voltage detecting circuit 3 includes a PNP bipolar transistor Tr1 having an emitter connected to the battery connecting terminal TB and a collector connected to the control circuit 1, and an NPN bipolar transistor Tr2 having a collector connected to the base of the PNP bipolar transistor Tr1, an emitter connected to the ground, and a base connected to one end of the control switch SWC.

For example, when the first switch element SW1 is turned on, a base current passes through the NPN bipolar transistor Tr2 and turns on the NPN bipolar transistor Tr2, thereby turning on the PNP bipolar transistor Tr1. Thus, the voltage of the battery connecting terminal TB is supplied to the control circuit 1 through the PNP bipolar transistor Tr2.

The current detecting circuit 4 detects a current passing through the three-phase bridge circuit X (i.e., a current passing through a resistor R). The current detecting circuit 4 outputs the detection result to the control circuit 1.

The control circuit 1 is supplied with a direct-current power supplied to one end of the control switch SWC and controls the three-phase bridge circuit X and the first and second switch elements SW1, SW2b, and SW2c.

The control circuit 1 can detect the number of revolutions of the motor generator M (i.e., the number of revolutions of the engine E). The control circuit 1 controls the three-phase bridge circuit X according to the detection result of the number of revolutions of the motor generator M, enabling commutation control on an alternating-current power supplied from the motor generator M or motor driving of the motor generator M.

In the case where a current detected by the current detecting circuit 4 has a current value corresponding to an overcurrent, the control circuit 1 turns off the relay circuit 6 by turning off the first switch element SW1.

In the case where the engine E is started (the number of revolutions of the motor generator M is equal to or higher than a predetermined number of revolutions), the control circuit 1 supplies the power outputted from the motor generator M to the battery B through the three-phase bridge circuit X and the relay circuit 6 (REG control).

The following will describe an example of an operation of the engine control unit 100 in the vehicle power supply system 1000 configured thus (a power supply method applied to the vehicle power supply system 1000).

Figure 2:
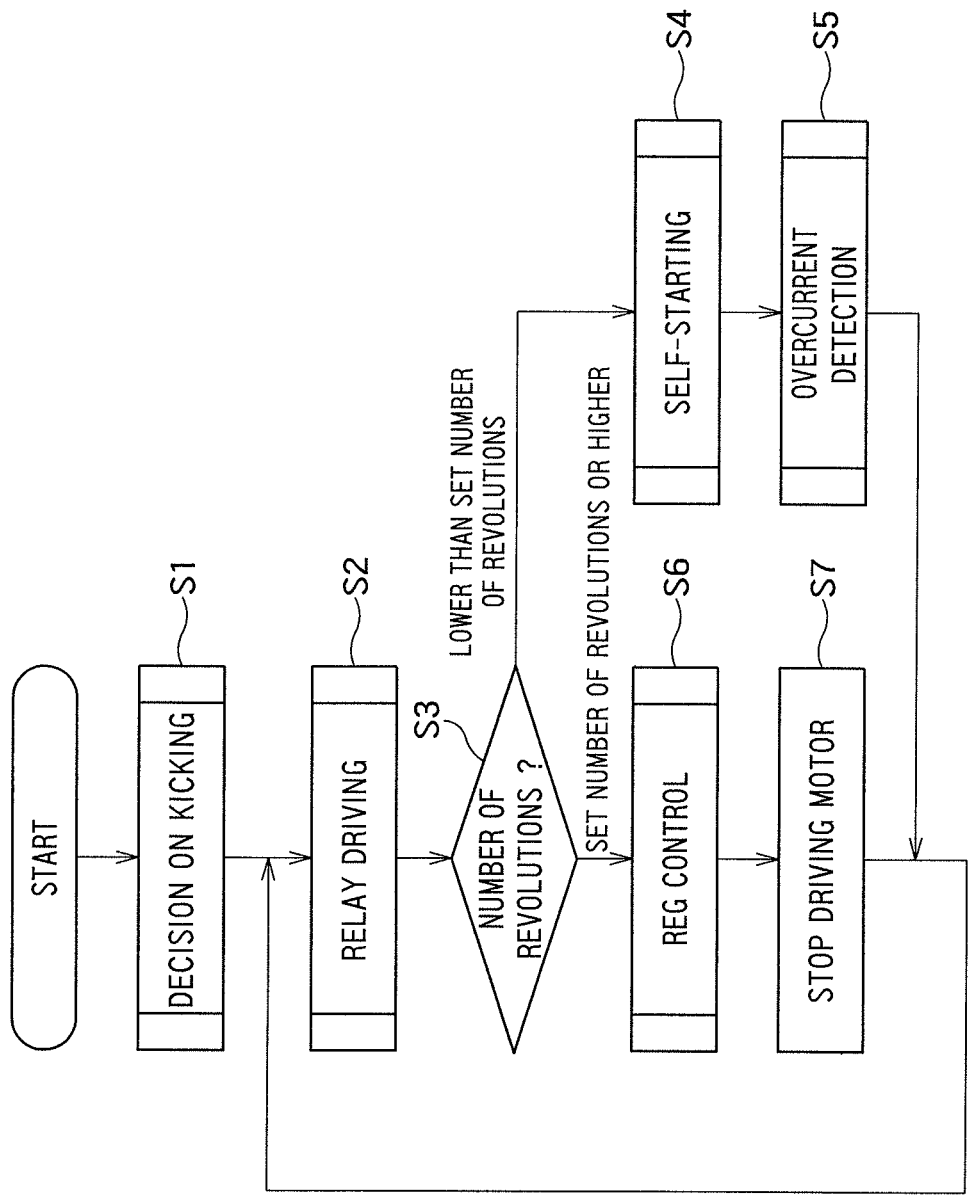
FIG. 2 is a flowchart showing an example of the overall operation of the engine control unit 100 in the vehicle power supply system 1000 of FIG. 1.

FIG. 2 is a flowchart showing an example of the overall operation of the engine control unit 100 in the vehicle power supply system 1000 of FIG. 1.

First, the user turns on the control switch SWC. When receiving power from one end of the control switch SWC, as shown in FIG. 2, the engine control unit 100 decides whether the user has kick-started the engine or not depending on the voltage Vd detected by the voltage detecting circuit 3 (step S1).

Figure 3:
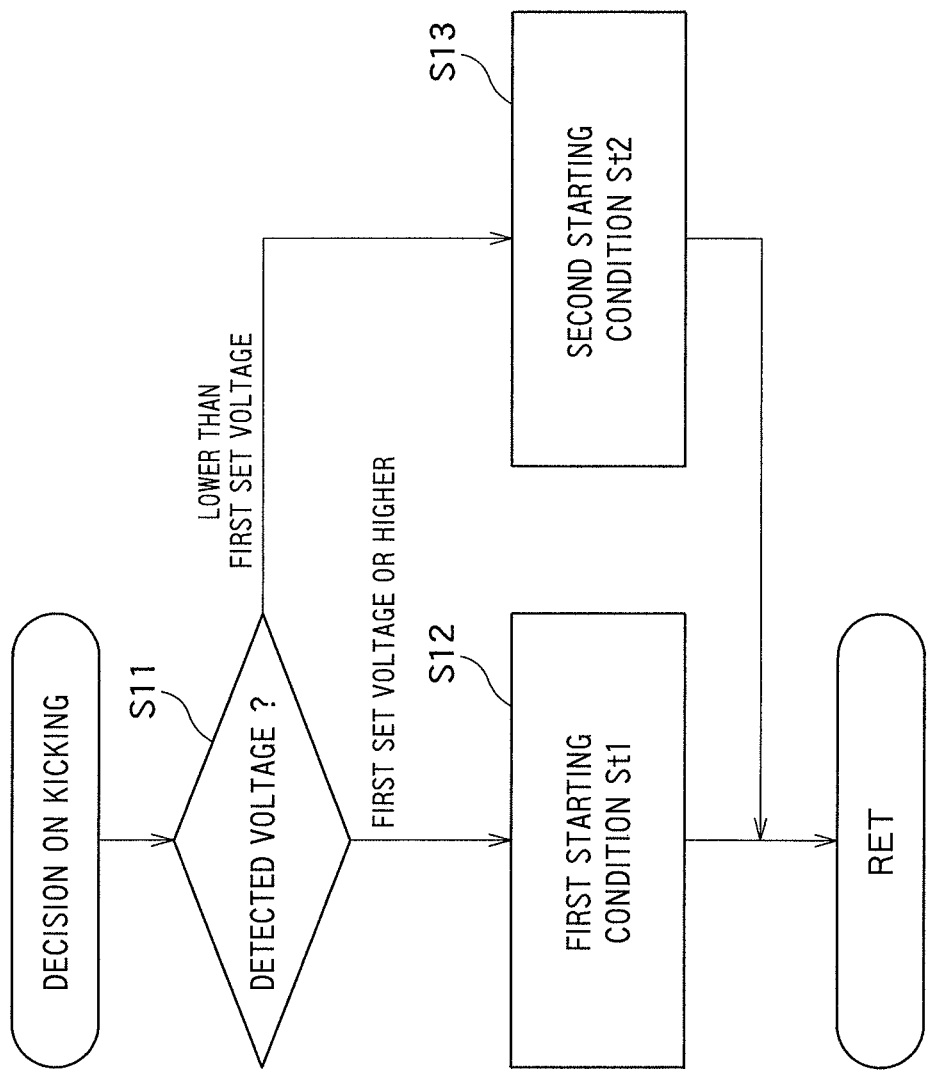
FIG. 3 is a flowchart showing the specific example of the decision on kicking (step S1) by the engine control unit 100 in FIG. 2.

A specific example of a decision on kicking (step S1) by the engine control unit 100 will be described below. FIG. 3 is a flowchart showing the specific example of the decision on kicking (step S1) by the engine control unit 100 in FIG. 2.

As shown in FIG. 3, first, in the case where the control switch SWC is turned on and power is supplied from one end of the control switch SWC, the control circuit 1 of the engine control unit 100 decides whether the voltage Vd detected by the voltage detecting circuit 3 is at least a first set voltage (step S11).

In the case where the voltage Vd detected by the voltage detecting circuit 3 is equal to or higher than the first set voltage, the control circuit 1 decides that a starting condition is a first starting condition St1 in which the battery B is connected to the battery connecting terminal TB and the voltage of the battery B is equal to or higher than a specified value (step S12).

In other words, power can be supplied from the battery B in the first starting condition St1.

In the case where the detected voltage Vd is lower than the first set voltage, the control circuit 1 decides that the starting condition is a second starting condition St2 in which the battery B is not connected to the battery connecting terminal TB or the voltage of the battery B is lower than the specified value and power is supplied from the motor generator M (step S13).

In other words, the user has kick-started the engine in the second starting condition St2. When deciding that an operating condition is the second starting condition St2, the control circuit 1 decides that the user has kick-started the engine.

In this way, it is decided whether the user has kick-started the engine in step S1 of FIG. 2.

As shown in FIG. 2, the engine control unit 100 controls an operation of the relay circuit 6 depending on whether the user has kick-started the engine (step S2).

Figure 4:
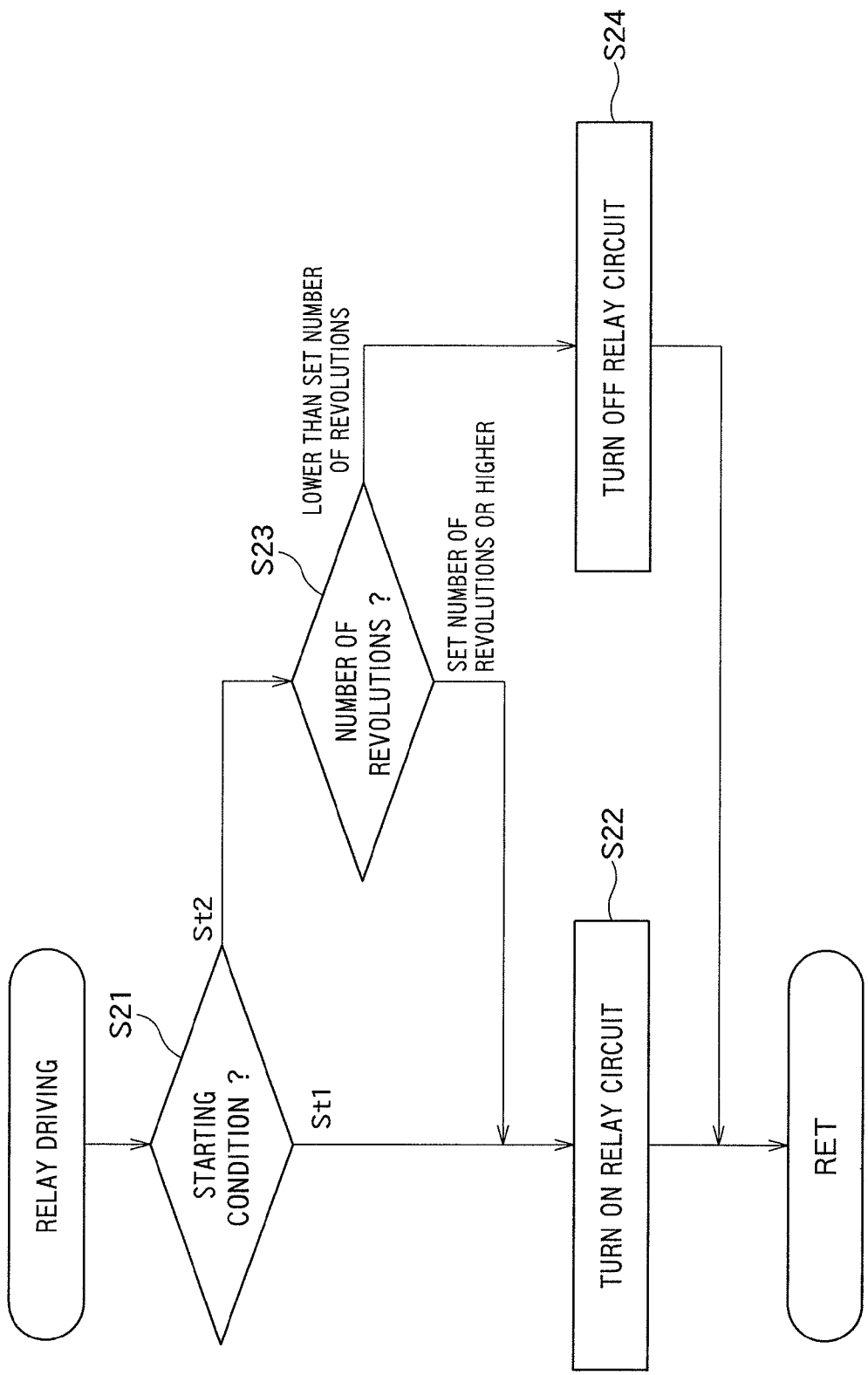
FIG. 4 is a flowchart showing the specific example of the relay driving operation (step S2) performed by the engine control unit 100 shown in FIG. 2.

A specific example of a relay driving operation (step S2) performed by the engine control unit 100 will be described below. FIG. 4 is a flowchart showing the specific example of the relay driving operation (step S2) performed by the engine control unit 100 shown in FIG. 2.

As shown in FIG. 4, the control circuit 1 first confirms a starting condition in step S21.

When deciding that a starting condition is the first starting condition St1, the control circuit 1 turns on the first switch element SW1, so that the coil L is energized to turn on the relay circuit 6 (step S22).

Thus, power can be supplied from the battery B to the motor generator M.

When deciding that a starting condition is the second starting condition St2, the control circuit 1 detects the number of revolutions of the motor generator M and decides whether the detected number of revolutions is at least a set number of revolutions (step S23).

In the case where the number of revolutions of the motor generator M is equal to or higher than the set number of revolutions, the control circuit 1 decides that the engine E connected to the motor generator M has been started. In this case, the control circuit 1 advances to previously discussed step S22 and turns on the first switch element SW1, so that the coil L is energized to turn on the relay circuit 6.

Thus, power can be supplied from the motor generator M to the battery B.

In the case where the number of revolutions of the motor generator M is lower than the set number of revolutions, the control circuit 1 decides that the engine E is being started. In this case, the control circuit 1 turns off the first switch element SW1, so that the coil L is deenergized to turn off the relay circuit 6 (step S24).

In this way, in step S2 of FIG. 2, the relay circuit 6 is controlled depending on its starting condition and the number of revolutions of the motor generator M.

Then, as shown in FIG. 2, the control circuit 1 decides whether the number of revolutions of the motor generator M is at least the set number of revolutions (step S3).

In the case where the number of revolutions of the motor generator M is lower than the set number of revolutions, the control circuit 1 advances to step S4.

Subsequently, as shown in FIG. 2, the control circuit 1 starts the engine E by self-starting by means of the motor generator M (step S4).

A specific example of a self-starting operation (step S4) performed by the engine control unit 100 in FIG. 2 will be described below.

Figure 5:
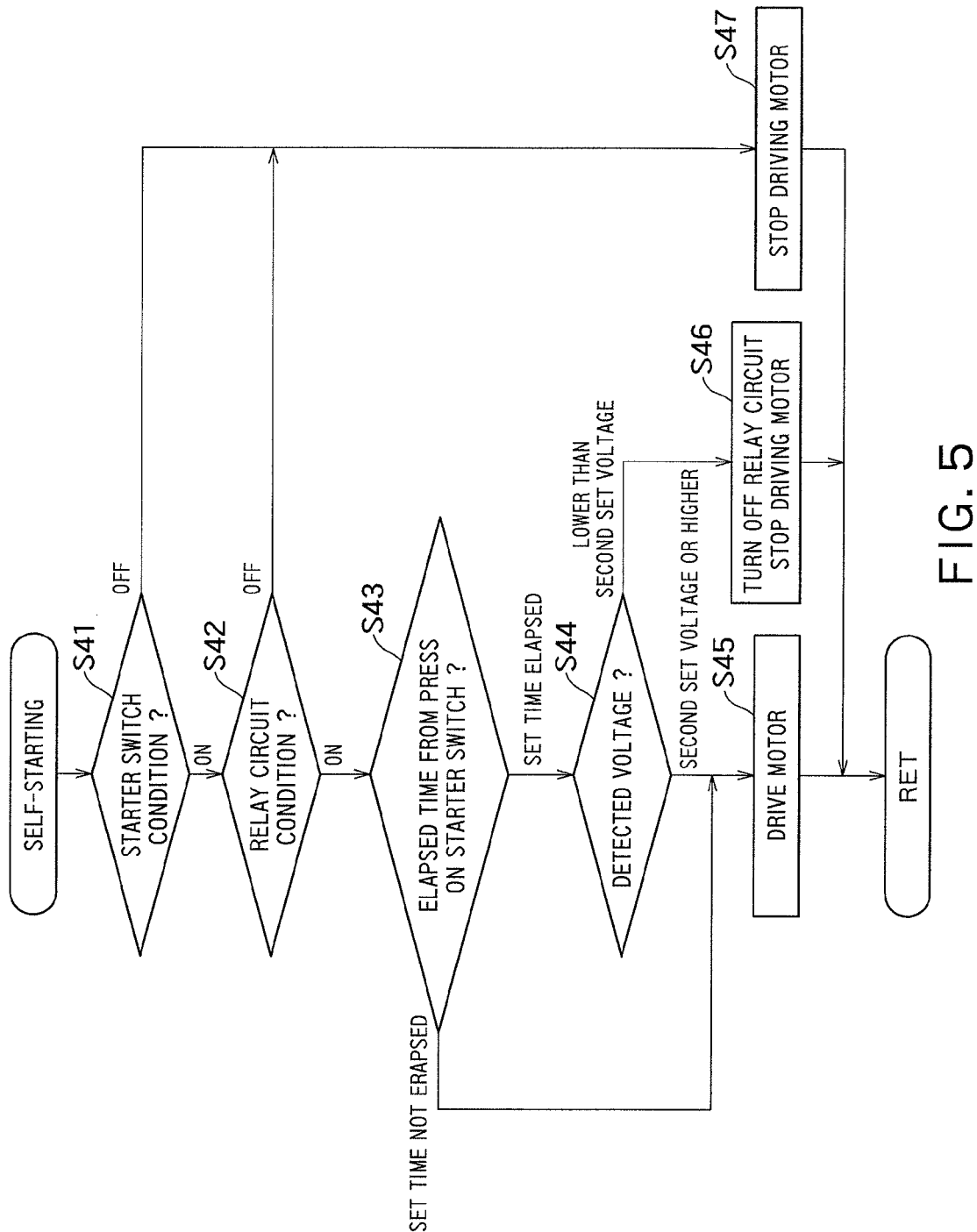
FIG. 5 is a flowchart showing a self-starting operation (step S4) performed by the engine control unit 100 in FIG. 2.

FIG. 5 is a flowchart showing a self-starting operation (step S4) performed by the engine control unit 100 in FIG. 2.

As shown in FIG. 5, in the case where the number of revolutions of the motor generator M is lower than the set number of revolutions (in other words, the engine E is being started), the control circuit 1 detects the condition of the starter switch SWS (step S41).

In the case where the starter switch SWS is turned on, the control circuit 1 advances to step S42 and detects the condition of the relay circuit 6.

In the case where the number of revolutions of the motor generator M is lower than the set number of revolutions, the starter switch SWS is turned on, and the relay circuit 6 is turned on, the control circuit 1 decides whether a set time has elapsed from the time the starter switch SWS is turned on (step S43).

In the case where the set time has elapsed, the control circuit 1 detects the voltage of the battery connecting terminal TB by means of the voltage detecting circuit 3.

In the case where the voltage Vd detected by the voltage detecting circuit 3 is equal to or higher than the second set voltage, the control circuit 1 drives the motor generator M (step S45).

In the case where the set time has elapsed and the detected voltage Vd is lower than the second set voltage, the control circuit 1 turns off the first switch element SW1 to turn off the relay circuit 6 and stop driving the motor generator M (step S46).

In other words, in step S46, the control circuit 1 decides that the battery B has degraded, and stops driving the motor generator M.

The control circuit 1 decides whether the set time has elapsed from the time the starter switch SWS is turned on. In the case where the set time has not elapsed, the control circuit 1 advances to step S45 without detecting the voltage of the battery connecting terminal TB by means of the voltage detecting circuit 3, and then the control circuit 1 drives the motor generator M.

Thus, an unnecessary voltage detecting step can be omitted.

In the case where the number of revolutions of the motor generator M is lower than the set number of revolutions and the starter switch SWS is turned off (step S41) or the relay circuit 6 is turned off (step S42), the control circuit 1 stops driving the motor generator M (step S47).

In this way, in the case where the number of revolutions of the motor generator M is lower than the set number of revolutions (in other words, the engine E is being started), the control circuit 1 decides whether to drive the motor generator M depending on the state of degradation of the battery B.

As shown in FIG. 2, after step S4, the control circuit 1 detects a current passing through the three-phase bridge circuit X (i.e., a current passing through the resistor R) by means of the current detecting circuit 4, and controls the first switch element SW1 so as to prevent the passage of an overcurrent through the three-phase bridge circuit X according to the detection result, thereby controlling the relay circuit 6 (step S5).

A specific example of an overcurrent detecting operation (step S5) performed by the engine control unit 100 in FIG. 2 will be described below.

Figure 6:
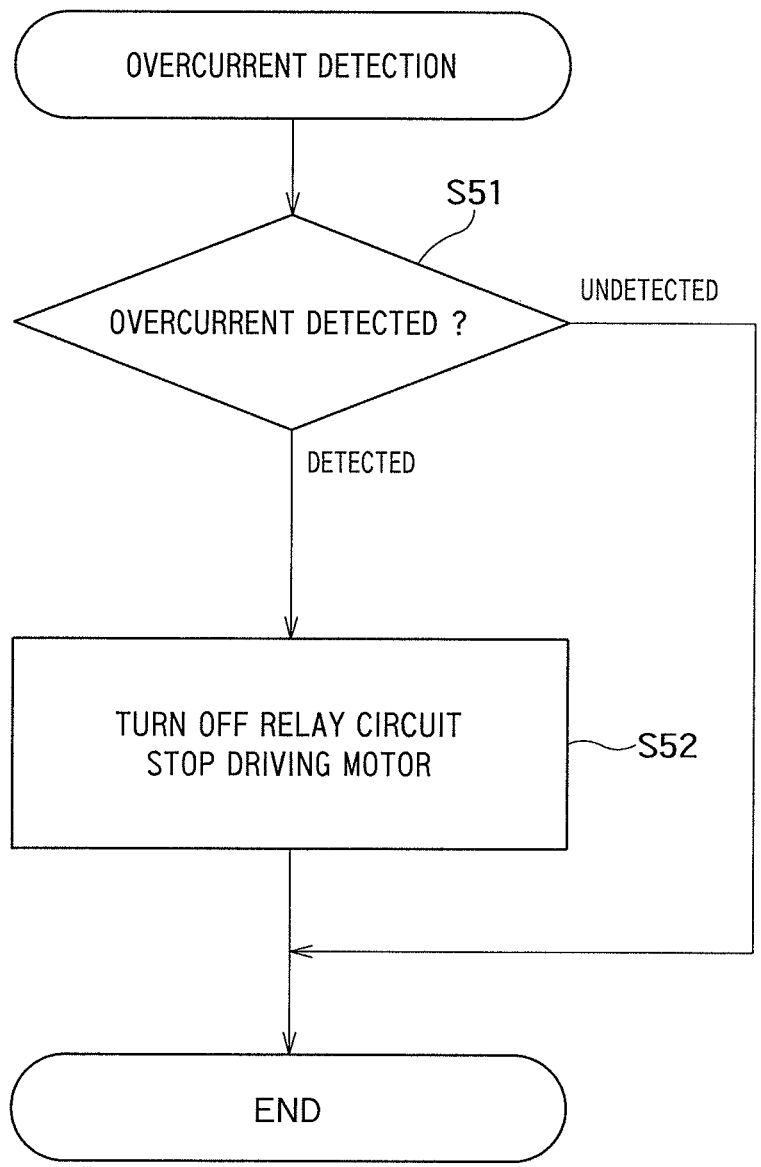
FIG. 6 is a flowchart showing the specific example of the overcurrent detecting operation (step S5) performed by the engine control unit 100 in FIG. 2.
Figure 7:
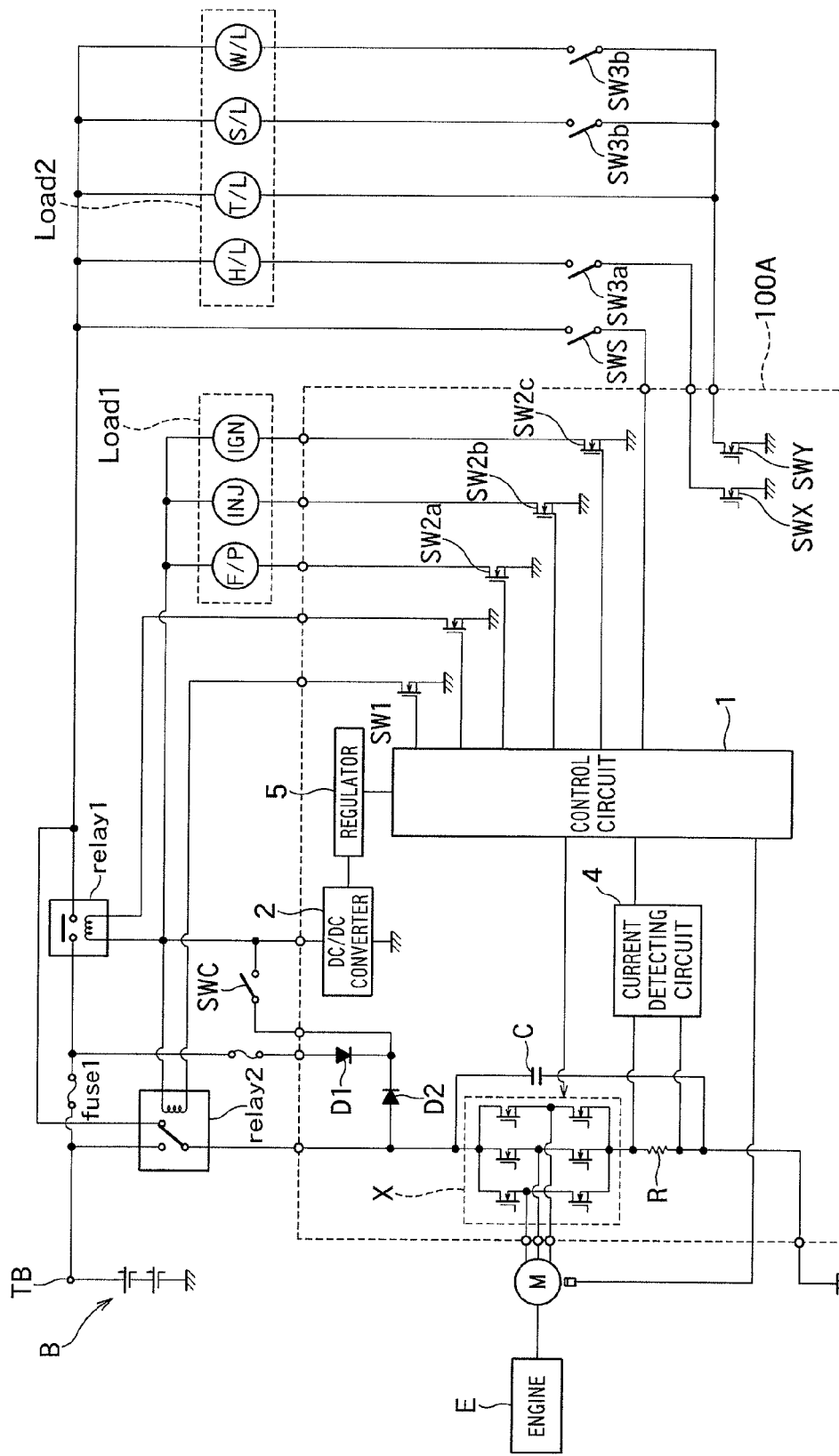
FIG. 7 is a diagram showing an example of a configuration of a conventional vehicle power supply system 1000A.

FIG. 6 is a flowchart showing the specific example of the overcurrent detecting operation (step S5) performed by the engine control unit 100 in FIG. 2.

As shown in FIG. 6, first, the control circuit 1 of the engine control unit 100 detects a current passing through the three-phase bridge circuit X (i.e., a current passing through the resistor R) by means of the current detecting circuit 4 (step S51).

In the case where the current detected by the current detecting circuit 4 has a current value corresponding to an overcurrent, the control circuit 1 turns off the relay circuit 6 by turning off the first switch element SW1 (step S52).

In the case where the current detected by the current detecting circuit 4 does not have a current value corresponding to an overcurrent, the control circuit 1 completes the overcurrent detecting operation.

Then, as shown in FIG. 2, the control circuit 1 returns to step S2 after step S5, and then repeats the above operation.

In step S3, in the case where the control circuit 1 decides that the number of revolutions of the motor generator M is equal to or higher than the set number of revolutions, the control circuit 1 advances to step S6 and supplies power from the motor generator M to the battery B through the three-phase bridge circuit X and the relay circuit 6 (REG control).

Then, the control circuit 1 stops driving the motor generator M (step S7) and returns to step S2 to repeat the above operation.

As described above, in the vehicle power supply system 1000 according to the embodiment of the present invention, self-starting and kick-starting can be achieved by the single diode D and the single relay circuit 6.

Therefore, the cost of the vehicle power supply system 1000 and the engine control unit 100 can be reduced and a harness can be remarkably shortened according to a simplification of the system, achieving lower system cost.

Furthermore, a motor current is applied only through the relay circuit 6 from the motor generator M.

Thus, the relay circuit 6 is turned on at the startup of the control circuit 1. This allows a user's press to turn on the starter switch SWS so as to quickly energize the motor, improving startup performance.

The engine control unit 100 is supplied with power through the DC-DC converter 2 in the engine control unit 100.

Thus, the DC-DC converter 2 raises a voltage upon kick-starting, shortening the starting time of the control circuit 1 with higher startup performance.

The embodiment is illustrative and is not intended to limit the scope of the invention.

DESCRIPTION OF REFERENCE NUMERALS 1 control circuit
2 DC-DC converter
3 voltage detecting circuit
4 current detecting circuit
5 regulator
100 engine control unit
6 relay circuit
1000 vehicle power supply system
TB battery connecting terminal
SWC control switch
SWS starter switch
SW3a, SW3b, SW3c switch
SW1 first switch element
SW2a, SW2b, SW2c second switch element
D diode
X three-phase bridge circuit
F1, F2, F3 fuse
M motor generator
B battery
E engine
Load1 first load
Load2 second load
F/P fuel pump
INJ injector
IGN ignition coil
H/L head lamp
T/L tail lamp
S/L stop lamp
W/L winker lamp

The invention claimed is:

1. A vehicle power supply system, comprising:
   a control switch that is turned on/off by a user;
   a starter switch that is turned on/off by the user;
   a relay circuit that is turned on by energizing a coil having a first end connected to a first end of the control switch, thereby making a first electrical connection between a battery connecting terminal connected to a battery and a first end of the starter switch, and a second electrical connection between the battery connecting terminal and a first end of a first load, and is turned off by deenergizing the coil so as to interrupt the battery connecting terminal from the first end of the starter switch and the first end of the first load; and
   an engine control unit that controls power supplied from the battery and a motor generator,
   wherein the engine control unit comprises:
   a three-phase bridge circuit that has a first end connected to the first end of the first load and a second end connected to a ground, the three-phase bridge circuit performing commutation control on an alternating-current power supplied from the motor generator or driving the motor generator;
   a DC-DC converter connected between the first end of the three-phase bridge circuit and a second end of the control switch;
   a diode that has an anode connected to the battery connecting terminal and a cathode connected to the second end of the control switch;
   a voltage detecting circuit that detects a voltage of the battery connecting terminal;
   a first switch element connected between a second end of the coil and the ground;
   a second switch element connected between a second end of the first load and the ground; and
   a control circuit that is supplied with a direct-current power supplied to the first end of the control switch and controls the three-phase bridge circuit and the first and second switch elements, and
   wherein the DC-DC converter has a first end connected to the first end of the first load and the first end of the three-phase bridge circuit, and has a second end connected to the cathode of the diode and the second end of the control switch.

2. The vehicle power supply system according to claim 1, wherein in the case where the control switch is turned on and power is supplied from the first end of the control switch,
   the control circuit decides, when the voltage detected by the voltage detecting circuit is equal to or higher than a first set voltage, that a starting condition is a first starting condition in which the battery is connected to the battery connecting terminal and has a voltage equal to or higher than a specified value, and
   the control circuit decides, when the detected voltage is lower than the first set voltage, that the starting condition is a second starting condition in which the battery is not connected to the battery connecting terminal or the battery has a voltage lower than the specified value and power is supplied from the motor generator.

3. The vehicle power supply system according to claim 2, wherein, when the control circuit decides that a starting condition is the first starting condition, the control circuit turns on the first switch element, so that the coil is energized to turn on the relay circuit.

4. The vehicle power supply system according to claim 2, wherein in the case where the control circuit is capable of detecting a number of revolutions of the motor generator and decides that the starting condition is the second starting condition,
   the control circuit decides, when the number of revolutions of the motor generator is equal to or higher than a set number of revolutions, that an engine connected to the motor generator has been started, and turns on the first switch element, thereby energizing the coil to turn on the relay circuit, and
   the control circuit decides, when the number of revolutions of the motor generator is lower than the set number of revolutions, that the engine is being started, and turns off the first switch element, thereby deenergizing the coil to turn off the relay circuit.

5. The vehicle power supply system according to claim 1, wherein the voltage detecting circuit includes:
   a PNP bipolar transistor having an emitter connected to the battery connecting terminal and a collector connected to the control circuit, and
   an NPN bipolar transistor having a collector connected to the base of the PNP bipolar transistor, an emitter connected to the ground, and a base connected to one end of the control switch.

6. The vehicle power supply system according to claim 1, wherein in the case where a number of revolutions of the motor generator is detectable, and the number of revolutions of the motor generator is lower than a set number of revolutions,
the control circuit decides whether to drive the motor generator depending on a state of degradation of the battery.

7. The vehicle power supply system according to claim 6, wherein in the case where the number of revolutions of the motor generator is lower than the set number of revolutions,
the control circuit decides, when the starter switch is turned on and the relay circuit is turned on, whether a set time has elapsed from a time the starter switch is turned on, and
in the case where the set time has elapsed, the control circuit drives the motor generator when the voltage detected by the voltage detecting circuit is equal to or higher than a second set voltage.

8. The vehicle power supply system according to claim 6, wherein the control circuit decides whether a set time has elapsed from a time the starter switch is turned on, and then the control circuit drives the motor generator without detecting the voltage of the battery connecting terminal by means of the voltage detecting circuit in the case where the set time has not elapsed.

9. The vehicle power supply system according to claim 6, wherein the control circuit decides whether a set time has elapsed from a time the starter switch is turned on, and then the control circuit turns off the first switch element to turn off the relay circuit and stop driving the motor generator in the case where the set time has elapsed and the detected voltage is lower than the second set voltage.

10. The vehicle power supply system according to claim 6, wherein, in the case where a number of revolutions of the motor generator is lower than a set number of revolutions and the starter switch is turned off or the relay circuit is turned off, the control circuit stops driving the motor generator.

11. The vehicle power supply system according to claim 1, wherein the engine control unit further comprises
a current detecting circuit that detects a current passing through the three-phase bridge circuit, and
wherein, in the case where a current detected by the current detecting circuit has a current value corresponding to an overcurrent, the control circuit turns off the relay circuit by turning off the first switch element.

12. The vehicle power supply system according to claim 1, wherein, in the case where the engine is started, the control circuit supplies a power outputted from the motor generator to the battery through the three-phase bridge circuit and the relay circuit.

13. The vehicle power supply system according to claim 1, wherein the engine control unit further comprises
a regulator that adjusts a voltage at one end of the control switch to a predetermined value and then supplies the voltage to the control circuit.

14. The vehicle power supply system according to claim 1, wherein the first load is a fuel pump of an engine, an injector of the engine, or an ignition coil of the engine.

15. A power supply method applied to a vehicle power supply system, comprising: a control switch that is turned on/off by a user; a starter switch that is turned on/off by the user; a relay circuit that is turned on by energizing a coil having a first end connected to a first end of the control switch, thereby making a first electrical connection between a battery connecting terminal connected to a battery and a first end of the starter switch, and a second electrical connection between the battery connecting terminal and a first end of a first load, and is turned off by deenergizing the coil so as to interrupt the battery connecting terminal from the first end of the starter switch and the first end of the first load; and an engine control unit that controls power supplied from the battery and a motor generator, wherein the engine control unit comprises: a three-phase bridge circuit that has a first end connected to the first end of the first load and a second end connected to a ground, the three-phase bridge circuit performing commutation control on an alternating-current power supplied from the motor generator or driving the motor generator; a DC-DC converter connected between the first end of the three-phase bridge circuit and a second end of the control switch; a diode that has an anode connected to the battery connecting terminal and a cathode connected to the second end of the control switch; a voltage detecting circuit that detects a voltage of the battery connecting terminal; a first switch element connected between a second end of the coil and the ground; a second switch element connected between a second end of the first load and the ground; and a control circuit that is supplied with a direct-current power supplied to the first end of the control switch and controls the three-phase bridge circuit and the first and second switch elements,
the power supply method comprising: in the case where the control switch is turned on and power is supplied from the first end of the control switch, deciding, when the voltage detected by the voltage detecting circuit is equal to or higher than a first set voltage, that a starting condition is a first starting condition in which the battery is connected to the battery connecting terminal and has a voltage equal to or higher than a specified value, and deciding, when the detected voltage is lower than the first set voltage, that the starting condition is a second starting condition in which the battery is not connected to the battery connecting terminal or the battery has a voltage lower than the specified value and power is supplied from the motor generator, and
wherein the DC-DC converter has a first end connected to the first end of the first load and the first end of the three-phase bridge circuit, and has a second end connected to the cathode of the diode and the second end of the control switch.

* * * * *